United States Patent
Geissenhoener et al.

(10) Patent No.: US 9,096,112 B2
(45) Date of Patent: Aug. 4, 2015

(54) WIND DEFLECTOR FOR A VEHICLE AND VEHICLE WITH A WIND DEFLECTOR

(71) Applicant: Dr. Ing. h.c. F. Porsche Aktiengesellschaft, Stuttgart (DE)

(72) Inventors: Kai Geissenhoener, Suhl (DE); Lars Schulz, Schoeneiche (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 0 days.

(21) Appl. No.: 14/322,267

(22) Filed: Jul. 2, 2014

(65) Prior Publication Data
US 2015/0028623 A1    Jan. 29, 2015

(30) Foreign Application Priority Data

Jul. 24, 2013 (DE) .......................... 10 2013 107 902

(51) Int. Cl.
*B60J 7/22* (2006.01)
(52) U.S. Cl.
CPC ...................... *B60J 7/223* (2013.01)
(58) Field of Classification Search
CPC ................ B60J 7/22; B60J 7/223; B60J 7/20
USPC ........................................................ 296/217
See application file for complete search history.

(56) References Cited

U.S. PATENT DOCUMENTS

| 4,165,120 A * | 8/1979 | Jardin et al. | 296/217 |
| 6,416,120 B1 * | 7/2002 | Schutt | 296/217 |
| 7,980,623 B2 | 7/2011 | Rossi | |

FOREIGN PATENT DOCUMENTS

| DE | 1876374 | 7/1963 |
| DE | 1020004027086 | 12/2005 |
| DE | 102010062840 | 6/2012 |

* cited by examiner

*Primary Examiner* — Dennis H Pedder
(74) *Attorney, Agent, or Firm* — Gerald E. Hespos; Michael J. Porco; Matthew T. Hespos

(57) ABSTRACT

A wind deflector (10) for a vehicle has a fastening section (11) for mounting the wind deflector (10) releasably on a retainer (13) of an upper cowl (14) of the vehicle and an air-guiding section (12) for guiding the flow of air. A locking device (17) assigned to the fastening section (11) releasably locks the wind deflector (10) to the retainer (13) of the upper cowl. The locking device (17) has at least one shiftable anchor (18), an actuator (19) and a spring (20). The actuator (17) interacts with the anchor (18) so that, when the actuator (19) is not actuated, the spring (20) presses the anchor (18) into a locking position, and, when the actuator (19) is actuated, that actuator presses the anchor (18) into an unlocking position counter to a spring force of the spring (20).

3 Claims, 3 Drawing Sheets

WIND DEFLECTOR FOR A VEHICLE AND
VEHICLE WITH A WIND DEFLECTOR

CROSS REFERENCE TO RELATED
APPLICATION

This application claims priority under 35 USC 119 to German Patent Appl. No. 10 2013 107 902.4 filed on Jul. 24, 2013, the entire disclosure of which is incorporated herein by reference.

BACKGROUND

1. Field of the Invention

The invention relates to a wind deflector for a convertible vehicle and to a vehicle with such a wind deflector.

2. Description of the Related Art

DE 1 876 374 U1 discloses a wind deflector for a vehicle, with a fastening section and an air-guiding section. The wind deflector can be mounted releasably via the fastening section in a recess in a front roof edge of the vehicle. The air-guiding section of the wind deflector is designed as an impact surface and functions to guide a flow of air. The fastening section of the wind deflector extends substantially forward in the longitudinal direction of the vehicle when the wind deflector is fastened to the roof front edge. The air-guiding section of the wind deflector extends substantially vertically up and has a curved section extending rearward when the wind deflector is fastened to the roof front edge.

The above-described wind deflector has disadvantages. First, the wind deflector is fastened inadequately on the roof front edge and is not secured against unintentional release during a journey. Second, the geometrical contouring of the wind deflector permits only an inadequate guiding of the flow.

An object of the invention is to provide a wind deflector that avoids the above-described disadvantages.

SUMMARY OF THE INVENTION

The invention relates to a wind deflector that includes a fastening section that includes a locking device for releasably locking the wind deflector to a retainer of the upper cowl. The locking device has at least one shiftable anchor, an actuator and a spring. The actuator interacts with the anchor in such a manner that, when the actuator is not actuated, the respective spring presses the respective anchor into a locking position, and such that, when the actuator is actuated, the actuator presses the anchor into an unlocking position counter to a spring force of the spring. Thus, the invention provides a simple and releasable fastening of the wind deflector to the upper cowl of the vehicle secured against inadvertent release.

The anchor is mounted at a first end on the fastening section to be pivotable about an axis of rotation. The actuator interacts with the anchor so that when the actuator is actuated, the actuator acts on a second end opposite the first end of the anchor, and the spring has one end supported on the fastening section and another end on a central section of the anchor. This configuration of the locking device enables a structurally simple securing of the wind deflector to the upper cowl against unintentional release.

The fastening section and the air-guiding section may extend substantially parallel to each other and may be connected to each other via a connecting section extending transverse or substantially perpendicular to same and protrude in relation to the connecting section on the same side thereof. This geometrical contouring of the wind deflector permits an optimum guiding of the flow.

A spring may be arranged in the retainer of the upper cowl and is deformable counter to a restoring force thereof by the fastening section of the wind deflector when the wind deflector is locked in the retainer. The restoring force of the spring element partially presses the wind deflector out of the retainer when the wind deflector is unlocked, thereby simplifying removal of the wind deflector from the upper cowl.

A retainer for the wind deflector may be provided in a region of a trunk, in which retainer the wind deflector can be positioned when the roof of the vehicle is closed. When the roof is open, the trunk accommodates roof segments of the roof. The roof segments can be placed in the trunk only when the wind deflector has been removed from the retainer in the trunk. This compels a driver to remove the wind deflector from the trunk and to mount the wind deflector on the cowl to open the roof.

Exemplary embodiments of the invention are explained in more detail with reference to the drawings, without being restricted thereto.

DETAILED DESCRIPTION OF THE PREFERRED
EMBODIMENTS

Figure 1:
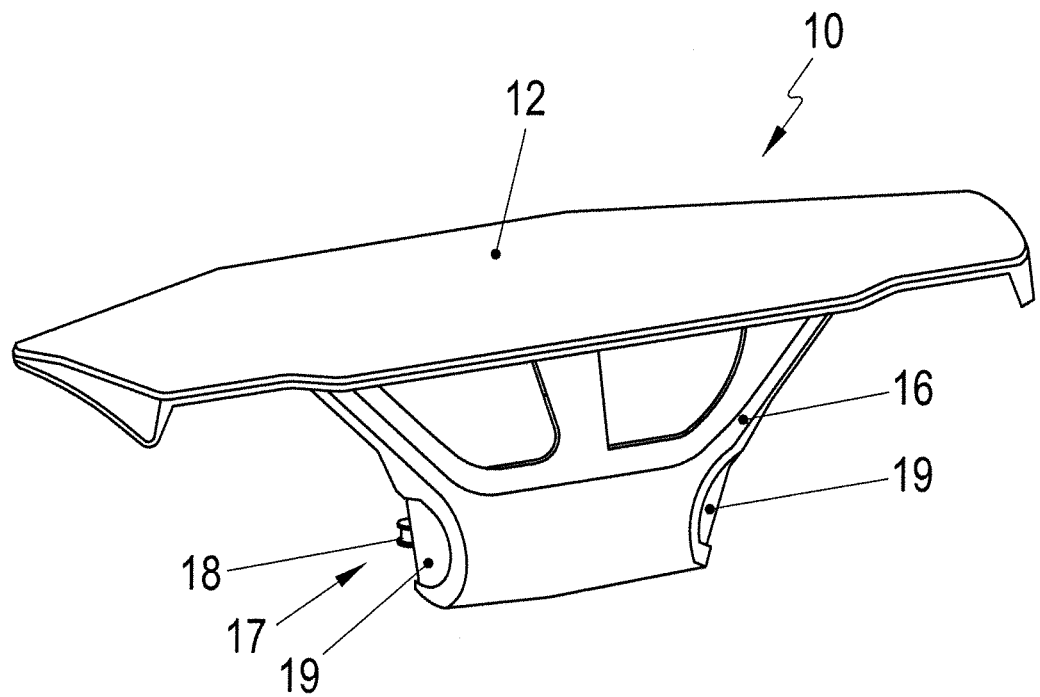
FIG. 1 is a rear perspective view of a wind deflector according to the invention.
Figure 2:
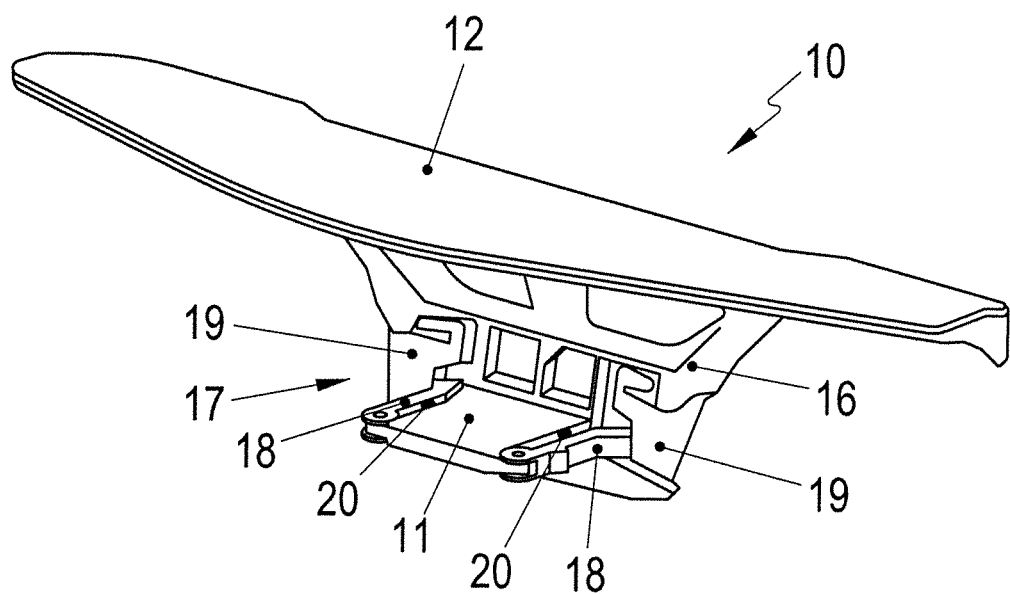
FIG. 2 is a front perspective view of the wind deflector of FIG. 1.
Figure 3:
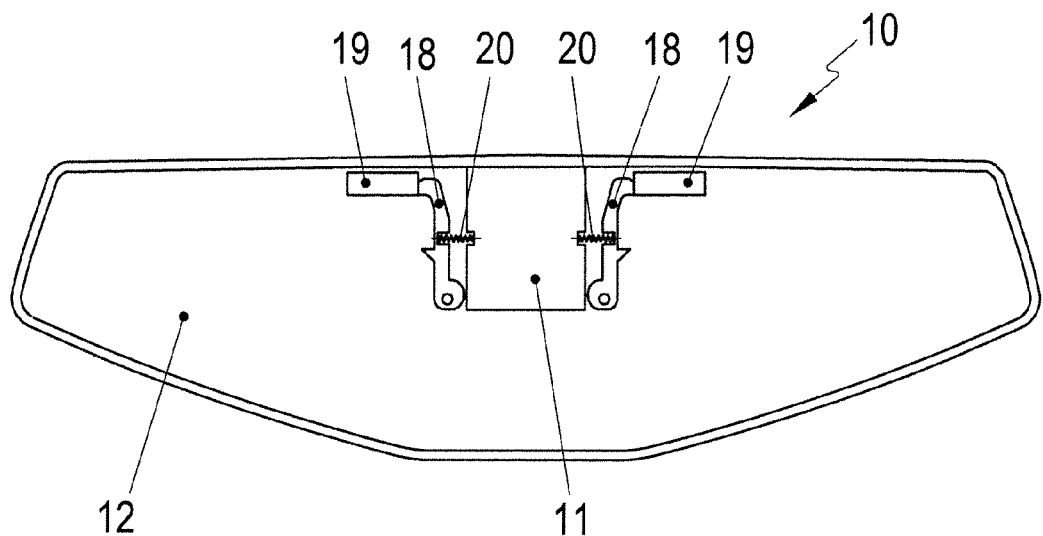
FIG. 3 is a bottom plan view of the wind deflector of FIGS. 1 and 2.

A wind deflector 10 for a convertible vehicle in accordance with the invention is identified by the numeral 10 in FIGS. 1 to 3. The wind deflector 10 has two main components, namely a fastening section 11 for mounting the wind deflector 10 releasably on a retainer 13 of an upper cowl 14 of the vehicle, and an air-guide 12 that guides a flow of air when the wind deflector 10 is mounted on the upper cowl 14.

Figure 4:
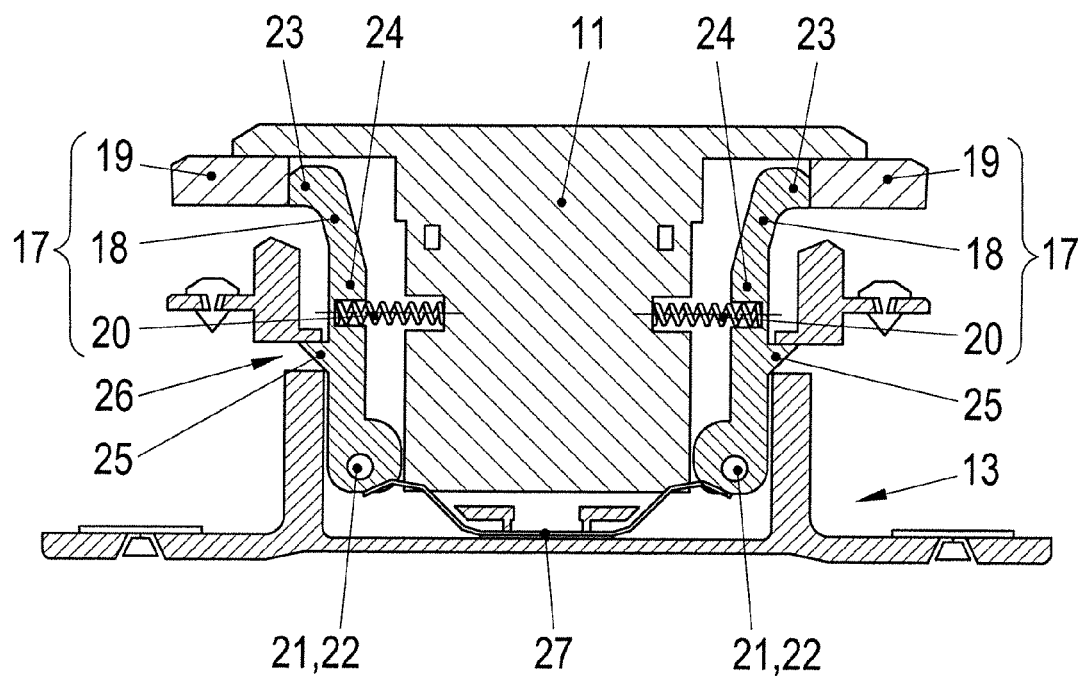
FIG. 4 is a first cross section through a wind deflector fastened in a retainer of a cowl of a motor vehicle.
Figure 5:
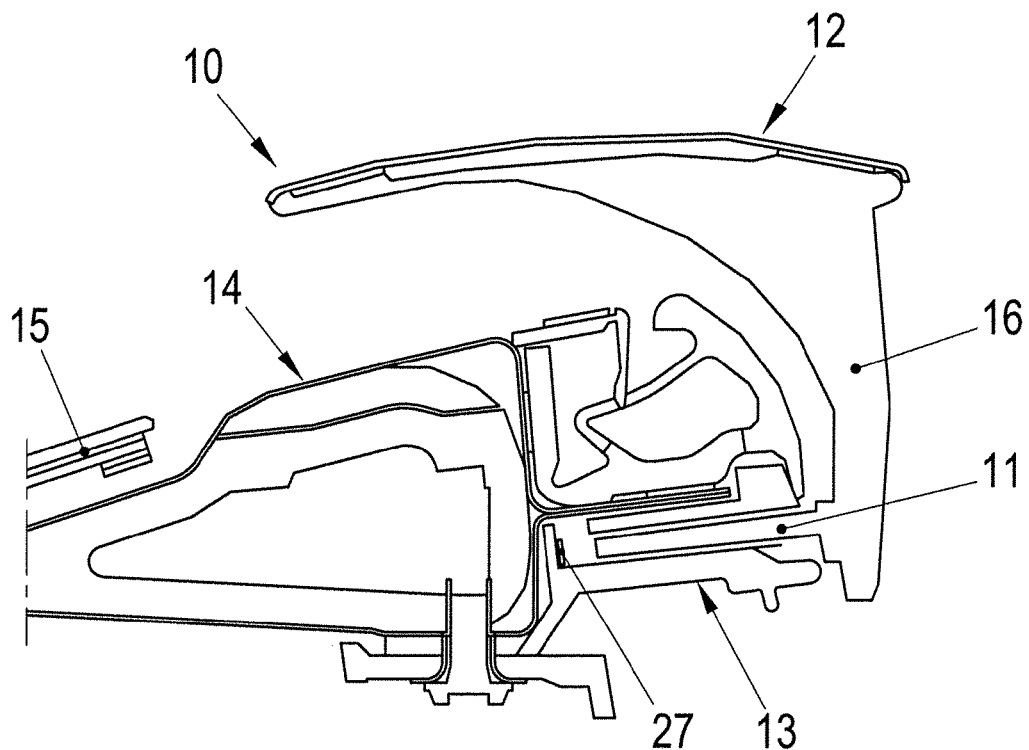
FIG. 5 is a second cross section through the wind deflector fastened in the retainer of the cowl.

FIGS. 4 and 5 are cross sections through the wind deflector 10 mounted in the retainer 13 of the upper cowl 14 and show the fastening section 11 of the wind deflector 10 inserted into the retainer 13 of the cowl 14. According to FIG. 5, the upper cowl 14 bounds an upper section a windshield 15.

The fastening section 11 and the air-guide 12 of the wind deflector 10 are connected to each other via a connecting section 16. The fastening section 11 enables the wind deflector 10 to be mounted releasably on the retainer 13.

The fastening section 11 of the wind deflector 10 has a locking device 17 for locking the wind deflector 10 releasably to the retainer 13 of the upper cowl 14 and for securing the wind deflector against unintentional release during a journey. In the illustrated embodiment, the locking device 17 has two anchors 18 disposed respectively on the sides of the fastening section 11. Actuators 19 and springs 20 interact respectively with the two anchors 18.

The actuators 19 and springs 20 interact with the respective anchor 18 so that the spring 20 presses the respective anchor 18 into a locking position for the wind deflector 10 when the actuator 19 is not actuated. However, when the actuator 19 is actuated, a force on the actuator 19 presses the respective anchor 18 into an unlocking position for the wind deflector 10 counter to the spring force of the respective spring 20. These relationships can be gathered best from FIG. 4.

FIG. 4 shows that the respective anchor 18 has a first end 21 mounted on the fastening element 11 of the wind deflector 10 for rotation about an axis of rotation 22. The respective anchor 18 also has a second end 23 opposite the first end 21. The actuator 19 interacts with the second end 23 of the anchor 18 for unlocking purposes. The respective spring 20 is supported at one end on the fastening section 11 and at the other end on a central section 24 of the respective anchor 18.

Whenever the actuators 19 are not actuated, no actuating force is exerted via the actuators 18 on the anchors 18, and therefore the springs 20 then press the anchors 18 into the locking position.

Latching lugs 25 are formed on central sections 24 of the anchors 18 and engage in corresponding recesses 26 on the retainer 13 of the upper cowl when the anchors 18 are in the locking position to lock the wind deflector 10 in the retainer 13 of the upper cowl 14.

The anchors 18 are moved out of the locking position shown in FIG. 4 into an unlocking position counter to the spring force of the springs 20 when an actuating force is exerted via the actuators 19 on the anchors 18. Thus, the latching lugs 25 of the anchors 18 move out of the recesses 26 of the retainer 13.

The wind deflector 10 can be removed from the retainer 13 simply by pulling the fastening section 11 of the wind deflector 10 out of the retainer 13 of the upper cowl 14 when the anchors 18 are in the unlocking position.

As shown in FIG. 4, a further spring 27 is assigned to the retainer 13 of the upper cowl 14 and is deformed whenever the fastening section 11 of the wind deflector 10 is inserted into the retainer 13 of the cowl 14. Accordingly, the further spring 27 is under prestress whenever the fastening section 11 of the wind deflector 10 is inserted into the retainer 13 of the upper cowl 14 and locked with the aid of the locking device 17.

The restoring force of the spring element 27 automatically presses the wind deflector 10 at least partially out of the retainer 13 after actuation of the actuators 19 unlocks the locking device 17. Thus, the wind deflector 10 is removed easily from the retainer 13 of the upper cowl 14 after the locking device 17 has been unlocked.

The above-described wind deflector 10 permits a secure, releasable mounting of the wind deflector 10 on the retainer 13 of the upper cowl 14 without the risk of the wind deflector 10 being released unintentionally from the retainer 13 of the upper cowl 14 at rapid driving speeds. A driver can actuate the actuators 19 with one hand so that the locked wind deflector 10 can be unlocked and removed from the retainer 13 of the upper cowl 14 with the assistance of the further spring 27.

As explained above, the fastening section 11 and the air-guide 12 of the wind deflector 10 are connected by a connecting section 16. The wind deflector 10 is designed so that the fastening section 11 and the air-guide 12 extend substantially parallel to each other. Thus, the connecting section 16 that connects the fastening section 11 and the air-guide 12 to each other extends transversely and substantially perpendicularly to the fastening section 11 and to the air-guide 12.

The fastening section 11 of the wind deflector 10 and the air-guide 12 of the wind deflector 10 extend forward in the longitudinal direction of the vehicle and toward the windshield 15 whenever the wind deflector 10 is mounted and locked on the retainer 13 of the upper cowl 14. Accordingly, the fastening section 11 and the air-guide 12 protrude in relation to the connecting section 16 on the same side of the connecting section 16. This geometrical contouring of fastening section 11, air-guide 12 and connecting section 16 permits an optimum guiding of the flow of relative air or relative wind.

The geometrical contouring of the wind deflector 10 prevents noise in the form of knocking and a flow of air back into a passenger compartment.

Figure 6:
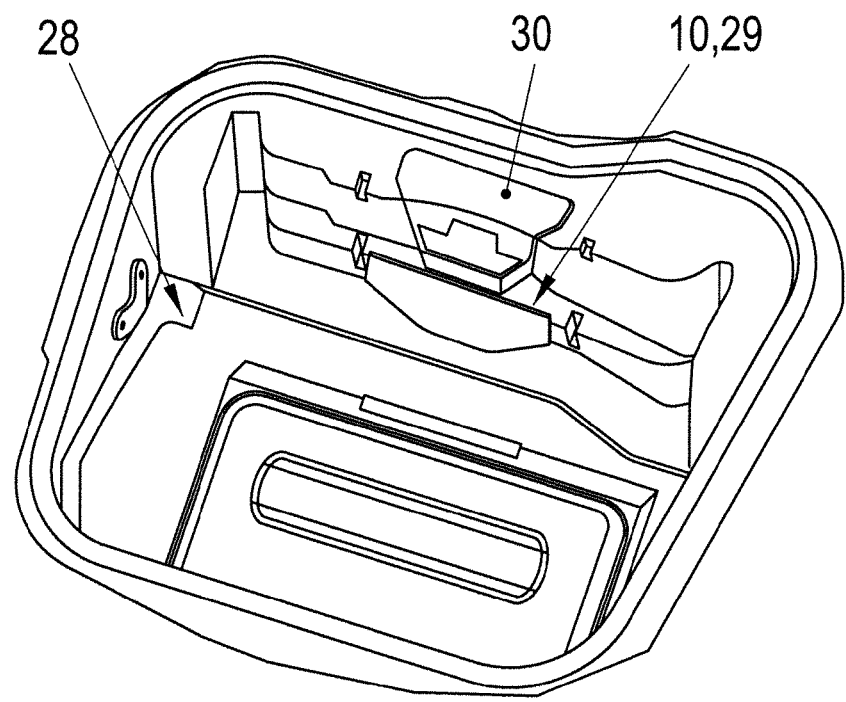
FIG. 6 is a perspective view from above of a trunk of the vehicle together with a wind deflector placed in the trunk.

A retainer 13 for the wind deflector 10 is provided in the region of the upper cowl 14, as explained above, and also an identical retainer 29 for the wind deflector 10 also is kept ready in the region of a trunk 28 (see FIG. 6). FIG. 6 thus shows that the wind deflector 10 preferably is placed in the retainer 29 in the trunk 28 whenever the roof of the vehicle is closed.

Roof segments of the roof are stored in the trunk 28 when the roof of the vehicle is opened. According to an advantageous development of the invention, this is possible only if the wind deflector 10 has been removed beforehand from the retainer 29 in the trunk 28.

The roof segments of the vehicle roof cannot be placed entirely in the trunk 28 if the wind deflector 10 is in the retainer 29 in the trunk 28. Accordingly, a driver is induced to remove the wind deflector 10 from the retainer 29 in the trunk 28 and to mount the wind deflector in the retainer 13 of the upper cowl 14 so that the roof segments that have been removed from the roof can be placed in the trunk 28. Thus, the motor vehicle is likely to be operated with the wind deflector 10 mounted on the upper cowl 14 whenever the roof is open.

FIG. 6 also shows a shaped part 30 that has to be removed from the trunk 28 to place the roof segments of an open roof of the vehicle therein and to remove the wind deflector 10 from the retainer 29 in the trunk 28. After the shaped part 30 and the wind deflector 10 are removed from the trunk 28, the roof segments of the roof can be placed in the trunk 28. The shaped part 30 subsequently is placed in turn in the trunk 28 to fix the roof segments, placed in the trunk 28, of the open roof in the trunk 28 and to avoid a relative movement of said roof segments with respect to one another during the journey and noises that may be caused as a result. However, as already explained, the wind deflector 10 has to have been removed from the retainer 29 in the trunk 28 before the roof segments of the open roof can be stored in the trunk 28.

What is claimed is:

1. A wind deflector for a convertible vehicle that has an upper cowl with a retainer, the wind deflector comprising: an air-guiding section for guiding a flow of air and a fastening section having a locking device for releasably locking the wind deflector to the retainer of the upper cowl, the locking device having at least one anchor, an actuator and a spring, the anchor having opposite first and second ends, the first end being mounted on the fastening section so as to be pivotable about an axis of rotation, the actuator interacting with the second end of the anchor, and the spring being supported at one end on the fastening section and at an opposite end on a central section of the respective anchor between the first and second ends, the central section of the anchor having a latching lug, the actuator interacting with the anchor so that, when the actuator is not actuated, the spring presses the anchor into a locking position where the latching lug can be introduced into a recess in the retainer of the upper cowl, and so that, when the actuator is actuated, a force on the actuator presses the respective anchor into an unlocking position counter to a spring force of the respective spring so that the latching lug can be removed from the recess.

2. A convertible vehicle, comprising: an upper cowl with a retainer; a wind deflector with an air-guiding section for guiding a flow of air and a fastening section having a locking device for releasably locking the wind deflector to the retainer of the upper cowl, the locking device having at least one pivotable anchor, an actuator and a spring, the actuator interacting with the anchor so that, when the actuator is not actuated, the spring presses the anchor into a locking position, and so that, when the actuator is actuated, forces on the actuator press the respective anchor into an unlocking position counter to a spring force of the respective spring; and a retainer for the wind deflector in a trunk of the vehicle for positioning the wind deflector in the trunk when the roof of the vehicle is closed.

3. A convertible vehicle, comprising: an upper cowl with a retainer; and a wind deflector with an air-guiding section for guiding a flow of air and a fastening section having a locking device for releasably locking the wind deflector to the retainer of the upper cowl, the locking device having at least one pivotable anchor, an actuator and a spring, the actuator interacting with the anchor so that, when the actuator is not actuated, the spring presses the anchor into a locking position, and so that, when the actuator is actuated, forces on the actuator press the respective anchor into an unlocking position counter to a spring force of the respective spring, wherein, when the wind deflector is mounted on the upper cowl, the fastening section and the air-guide both extend substantially forward and toward a windshield of the vehicle that is partially bounded by the upper cowl and further extend in the longitudinal direction of the vehicle from a connecting section that connects the fastening section and the air-guide.

* * * * *